(12) United States Patent
Després

(10) Patent No.: US 7,874,387 B2
(45) Date of Patent: Jan. 25, 2011

(54) TRACK EXTENSION FOR VEHICLE TRACK SYSTEMS AND METHOD

(76) Inventor: Jean Després, 550 Premier Rang, St-Antonin, Québec (CA) G0L 2L0

( * ) Notice: Subject to any disclaimer, the term of this patent is extended or adjusted under 35 U.S.C. 154(b) by 741 days.

(21) Appl. No.: 11/675,358

(22) Filed: Feb. 15, 2007

(65) Prior Publication Data

US 2008/0196948 A1 Aug. 21, 2008

(51) Int. Cl.
*B62D 55/08* (2006.01)
*B62D 55/30* (2006.01)

(52) U.S. Cl. .................... 180/9.21; 180/9.26; 180/9.23; 180/9.25; 305/33; 305/34; 305/165; 305/185

(58) Field of Classification Search ................ 180/9.21, 180/9.26, 9.23, 9.25; 305/33, 34, 165, 185
See application file for complete search history.

(56) References Cited

U.S. PATENT DOCUMENTS

| | | | |
|---|---|---|---|
| 5,273,126 A * | 12/1993 | Reed et al. ................ 180/9.21 |
| 5,607,210 A | 3/1997 | Brazier |
| 6,615,939 B1 | 9/2003 | Karales et al. |
| 6,962,222 B2 * | 11/2005 | Kirihata ..................... 180/9.46 |
| 7,188,915 B2 * | 3/2007 | Lemke et al. ............... 305/195 |
| 7,255,184 B2 * | 8/2007 | Loegering et al. .......... 180/9.26 |
| 7,328,760 B2 * | 2/2008 | Inaoka et al. .............. 180/9.21 |
| 7,406,769 B1 * | 8/2008 | Toussaint ....................... 30/93 |

* cited by examiner

*Primary Examiner*—Lesley Morris
*Assistant Examiner*—Marlon A Arce
(74) *Attorney, Agent, or Firm*—Ogilvy Renault LLP

(57) ABSTRACT

A track extension in combination with a track system comprises a track system having a track frame, wheels mounted to the frame and adapted to allow cyclic movement of a track about the frame, drive means in the frame adapted to transmit a drive of a vehicle to the track to drive the track in a cyclic movement. An extension frame is releasably secured to an end of the track frame. An idler wheelset is mounted to an end of the extension frame. A track is mounted about the track frame and the extension frame such that a footprint of the track is delimited at an end by the engagement of the track with the idler wheelset. A method is provided to increase a footprint of a track system.

17 Claims, 5 Drawing Sheets

US 7,874,387 B2

TRACK EXTENSION FOR VEHICLE TRACK SYSTEMS AND METHOD

BACKGROUND OF THE INVENTION

1. Field of the Invention

The present invention relates to vehicles using tracks as interface with the ground, and more particularly to the adaptability of tracks to various terrains.

2. Background Art

Tracks are commonly used as the interface of a vehicle with the ground. More specifically, tracks provide more support on the ground and more traction than wheels, thus they are often used in harsh terrain conditions. As an example, army tanks, all-terrain vehicles and the like are equipped with tracks. Track conversion units are provided as replacements for wheels when a vehicle must be used in harsh conditions, such as mud, snow, etc. When a wheel-mount track conversion unit is used, the wheels on the vehicle are removed and replaced by track conversion units, such that tracks become the interface between the vehicle and the terrain. The vehicles using such track conversion units are all-terrain vehicles (hereinafter ATVs), trucks, etc.

It is often desired to increase the footprint of a track on the ground. Amongst the advantages resulting from an increased footprint are the increased traction of the track, as well as the spreading of the weight of the vehicle. Such advantages cause an increased performance of the vehicle in semi-solid terrain (e.g., mud, snow, etc.).

SUMMARY OF INVENTION

It is therefore an aim of the present invention to provide a novel track extension for track systems and track conversion units that addresses issues associated with the prior art.

It is a further aim of the present invention to provide a novel method for increasing a footprint of a track system.

Therefore, in accordance with the present invention, there is provided a track extension in combination with a track system, comprising: a track system having a track frame, wheels mounted to the frame and adapted to allow cyclic movement of a track about the frame, drive means in the frame adapted to transmit a drive of a vehicle to the track to drive the track in a cyclic movement; an extension frame releasably secured to an end of the track frame; an idler wheelset mounted to an end of the extension frame; and a track mounted about the track frame and the extension frame such that a footprint of the track is delimited at an end by the engagement of the track with the idler wheelset.

Further in accordance with the present invention, there is provided a method for extending a footprint of a track system, comprising the steps of: i) removing a first track from a track system; ii) installing a frame supporting an idler wheelset at an end of the track system to extend a distance between the idler wheelsets and an opposed idler wheelset on opposed ends of the track system; and iii) installing a second track with a footprint of the track system being delimited by the idler wheelsets with the track moveable in a cyclic motion about the idler wheelsets; whereby a footprint of the track system is increased.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
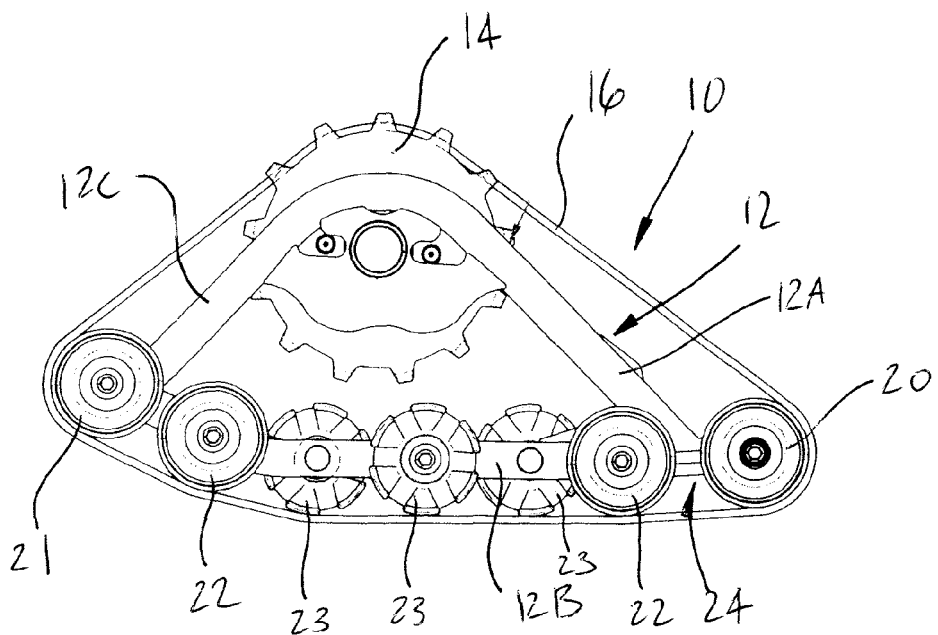
FIG. 1 is a left-side elevation view of a track conversion unit in accordance with the prior art.
Figure 2:
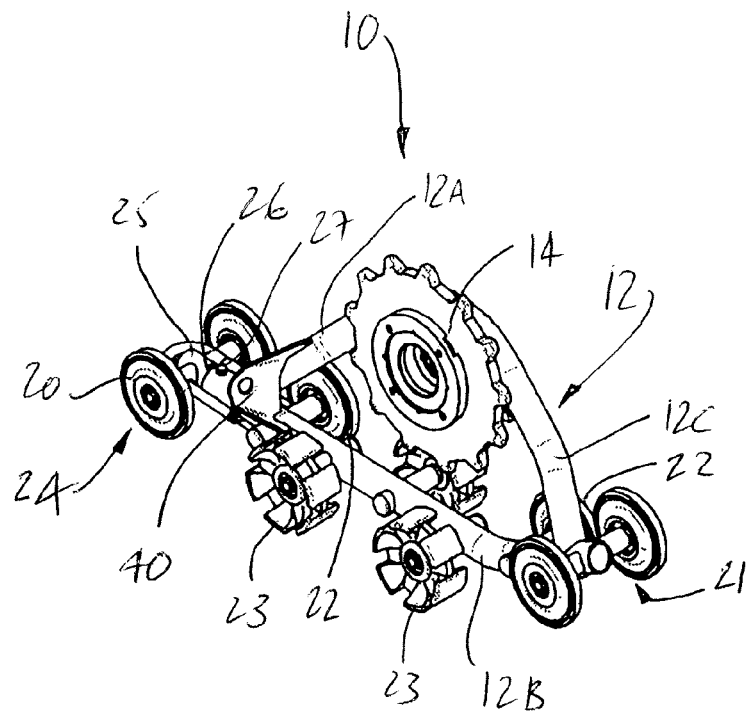
FIG. 2 is a front-right isometric view of the track conversion unit of FIG. 1, without a track.

Referring to FIGS. 1 and 2, a track conversion unit in accordance with the prior art is generally shown at 10. The track conversion unit 10 is a wheel-mount type conversion unit, for instance used in place of a wheel of an ATV. The track conversion unit 10 has a frame 12 (i.e., track frame 12), upon which is mounted a drive sprocket 14.

The frame 12 has a rear frame member 12A, a base frame member 12B and a front frame member 12C. The drive sprocket 14 receives an output from a drive shaft of a vehicle, and transmits the output to a track 16 of the track conversion unit 10. The track 16 is as an example a one-piece vulcanized belt, but may have numerous other configurations as well. A trailing wheelset 20 and a leading wheelset 21 combine with the drive sprocket 14 to tauten the track. Idler wheels 22 and idler sprockets 23 provide support to a bottom portion of the track.

The trailing wheelset 20 is part of a wheelset assembly 24. The wheelset assembly 24 has a telescopic arm 25 that is received in an open end 26 of the base frame member 12B. A tensioning mechanism 27 is provided to lock the position of the wheelset 20 with respect to the base frame member 12B to adjust the tension in the track, and to increase/reduce the footprint of the track on the ground.

Figure 6:
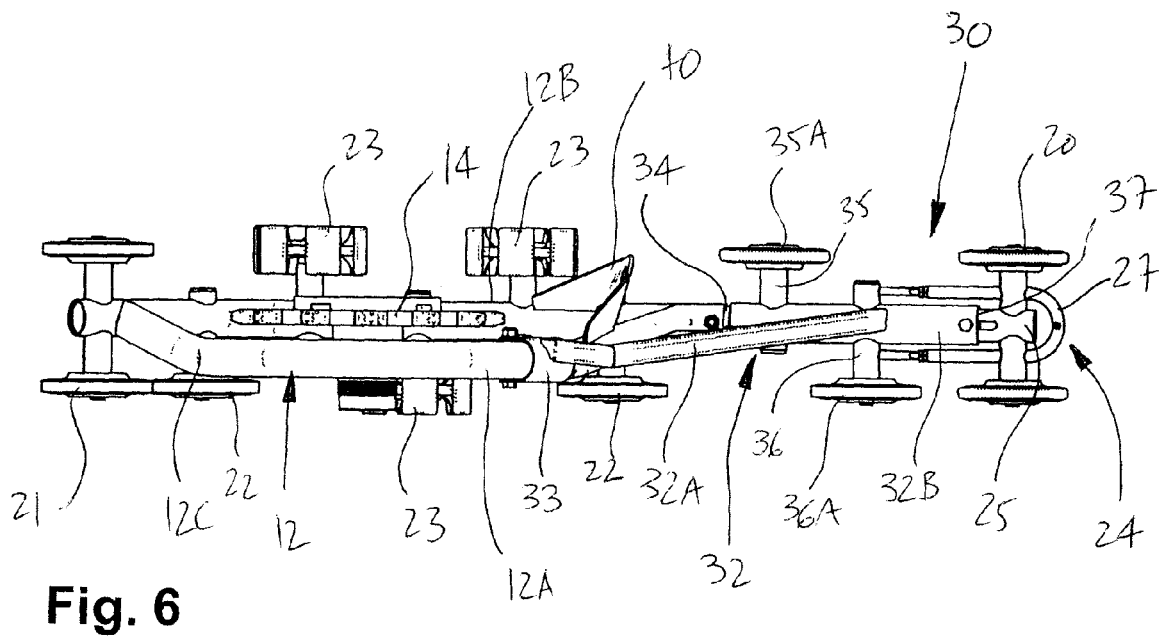
FIG. 6 is a top plan view of the extended track conversion unit of FIG. 3, without a track.
Figure 7:
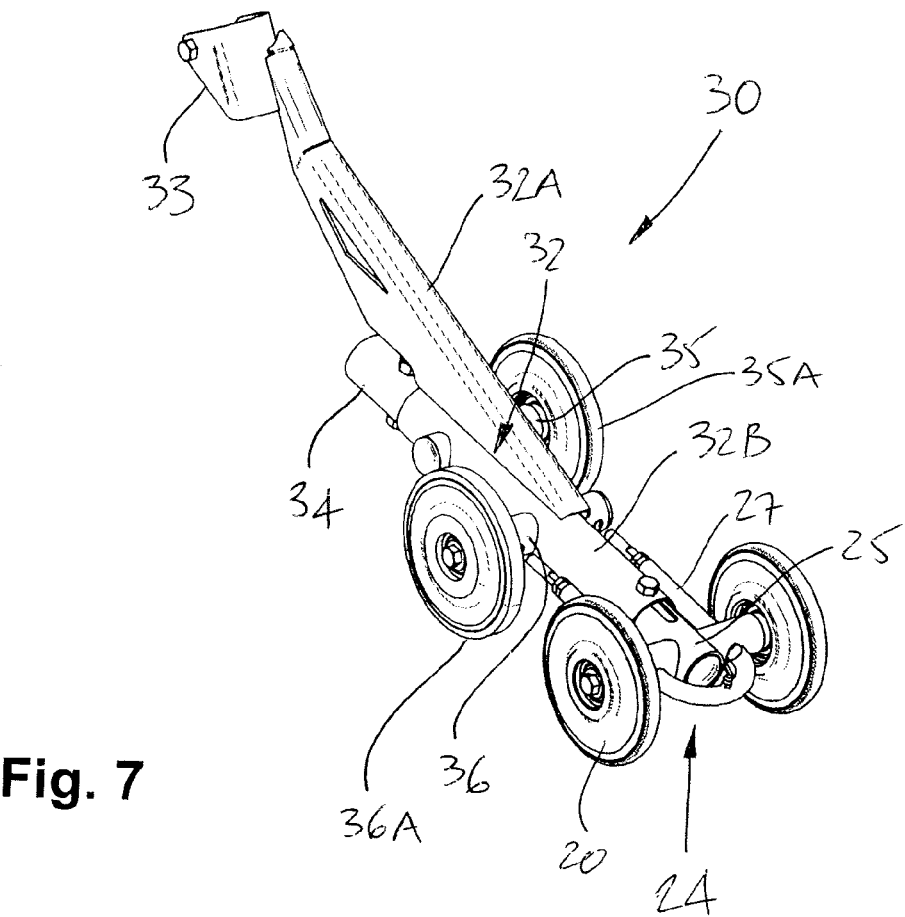
FIG. 7 is a perspective view of the track extension as removed from the track conversion unit of FIG. 1, with idler wheels and trailing wheelset.
Figure 8:
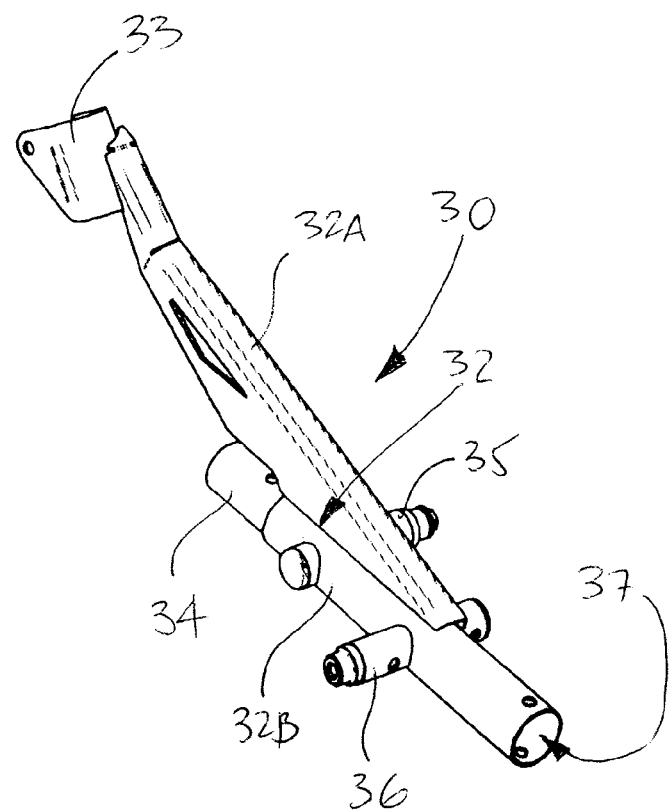
FIG. 8 is a perspective view of the track extension of FIG. 7, without the idler wheels and trailing wheelset.

Referring to FIGS. 7 and 8, a track conversion unit equipped with a track extension is generally shown at 10', and is essentially similar to the track conversion unit 10 of FIGS. 1 and 2, but with the track extension 30. As such, like elements between the track conversion unit 10 of FIGS. 1 and 2, and the extended track conversion unit 10' of FIGS. 3 to 8 will bear like reference numerals.

Referring to FIGS. 7 and 8, the track extension 30 has a frame 32 (i.e., extension frame 32). The frame 32 has a reinforcement arm 32A and a base frame member 32B.

The reinforcement arm 32A relates the base frame member 32B to the rear frame member 12A of the track conversion unit 10. The reinforcement arm 32A has a connector bracket 33 at a front end thereof. The connector bracket 33 clamps onto the rear frame member 12A of the track conversion unit 10, for instance by way of a fastener such as a bolt. A bottom end of the reinforcement arm 32A is secured directly (e.g., welded) to the base frame member 32B.

Referring to FIGS. 7 and 8, the base frame member 32B supports the idler wheels interfacing with the track and connects to the base frame member 12B of the track conversion unit 10. More specifically, the base frame member 32B is typically a tube having a connector 34 protruding from its front end. The connector 34 is fitted into the base frame member 12B of the frame 12, and fasteners such as bolts are used to lock the base frame members 12B and 32B to one another.

Axles 35 and 36 project radially from opposed sides of the base frame member 32B. The axles 35 and 36 will respectfully support idler wheels 35A and 35B (FIG. 7).

The wheelset assembly 24 of FIGS. 1 and 2 is inserted at a rear open end 37 of the base frame member 32B. As such, the rear bending wheelset 20 is at the rear end of the track extension 30, with the adjustment mechanism 27 provided to allow the telescopic adjustment of the wheelset assembly 24 with respect to the extended track conversion unit 10'.

An attachment bracket 40 is part of the track conversion unit 10 and is provided so as to interface the frame 12 to suspension members or like structural members.

Now that the track extension 30 has been described, its installation to an existing track unit, such as the track conversion unit 10, is described.

The track conversion unit 10 of FIG. 1 has the track 16 removed. This may be performed by loosening the trailing wheelset 20 using the tensioning mechanism 27. Accordingly, once the track 16 is removed, the track conversion unit 16 has the configuration illustrated in FIG. 2.

Figure 3:
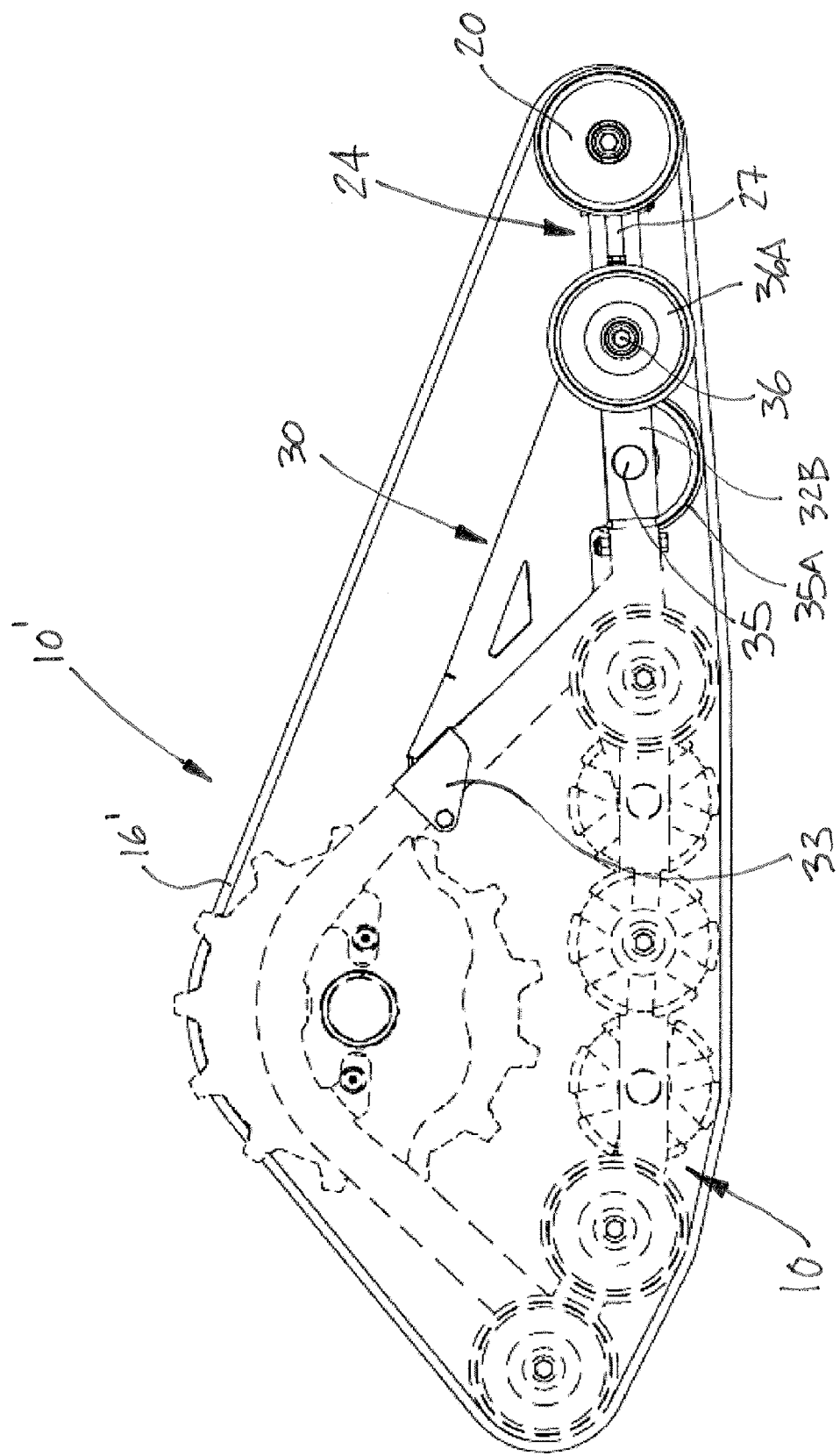
FIG. 3 is a left-side elevation view of an extended track conversion unit highlighting a track extension in accordance with an embodiment of the present invention.

In order to assemble the extended track conversion unit 10' of FIG. 3, the track extension 30 is mounted to the track conversion unit 10. In a first step, the wheelset assembly 24 is separated as a whole from base frame member 12B (including the tensioning mechanism 27 being separated from an axle of idlers wheels 22), leaving the open end 26 of the base frame member 12B exposed.

The track extension 30 illustrated in FIG. 7 is mounted to the frame 12 of the track conversion unit 10. More specifically, the connector 34 is matingly engaged in the open end 26 of the base frame member 12B, whereas the bracket 33 is mounted to the rear frame member 12A. At both these locations, the track extension 30 is fastened to the frame 12 so as to block rotation of the base frame member 32B with respect to the base frame member 12B.

Figure 4:
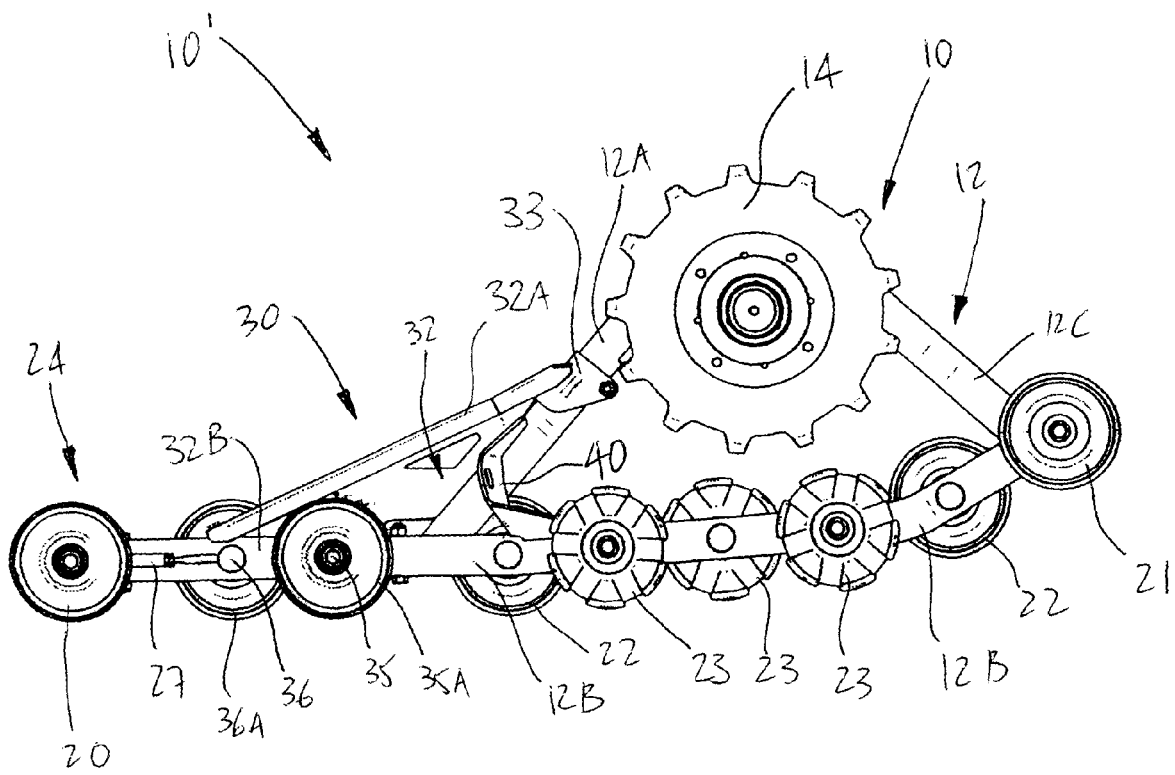
FIG. 4 is a right-side elevation view of the extended track conversion unit of FIG. 3, without a track.
Figure 5:
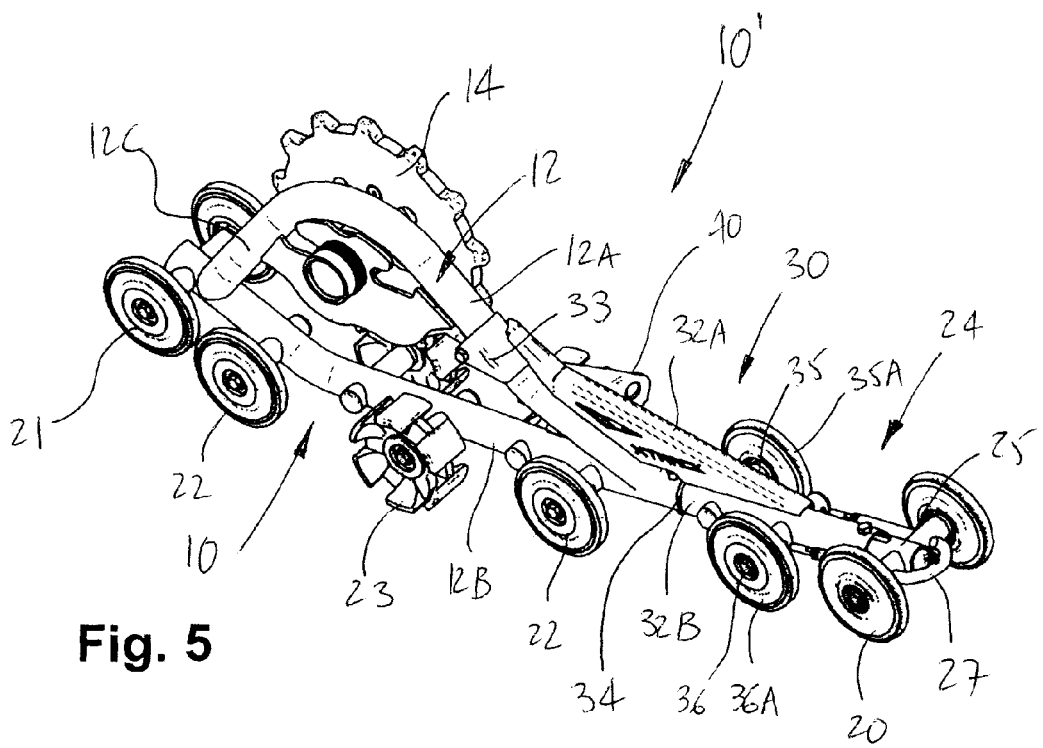
FIG. 5 is a rear-left isometric view of the extended track conversion unit of FIG. 3, without a track.

Accordingly, as shown in FIGS. 4 and 5, the track extension 30 is secured to the frame 12 at two different locations. As such, an extended frame is formed with suitable structural rigidity to support a track, and to sustain the forces involved with the track. The materials and components used to fabricate the track extension must therefore be suited for such harsh conditions.

Once the track extension 30 has been mounted to the track conversion unit 10, the wheelset assembly 24 is mounted to the rear open end 37 of the base frame member 32B. This is performed by inserting the telescopic arm 25 of the wheelset assembly 24 into the rear open end 37, and fastening these components to one another, to provide the extended track conversion unit 10' illustrated in FIGS. 4 and 5.

The track 16' is then mounted about the extended track conversion unit 10' in the manner illustrated in FIG. 3. More specifically, the track 16' is arranged so as to be properly engaged with the drive sprocket 14. The track 16' has a greater periphery than the track 16, as a footprint of the track conversion unit is increased by the configuration illustrated by 10'.

The position of the wheelset assembly 24 is adjusted so as to tension the track 16'. This is performed by adjusting the tensioning mechanism 27 (which cooperates with the axle 36) until suitable tension is attained for the track 16'. The extended track conversion unit 10' is then ready to be used.

It is pointed out that the track conversion unit 10' may be returned to the configuration illustrated by 10 in FIGS. 1 and 2, if it is required to reduce the footprint of the track. As such, operators of vehicles using tracks can have sets of tracks adapted for different conditions, by way of the track extension 30 enabling the use of longer tracks.

The track extension 30 is advantageously available as a retrofit kit that allows the increase of the footprint of existing track systems. It is pointed out that the track extension described at 30 is shaped and sized so as to fit with the components of the track system. In the embodiment described in FIGS. 3 to 8, the wheelset assembly 24 does not need to be altered to be used with the track extension 30. Moreover, the track extension 30 does not affect the relation between the track conversion unit 10 and the drive shaft of the vehicle, as all moveable components of the track extension are idlers.

Referring to FIG. 6, it is seen that the sprocket 14 is centrally positioned between left and right idlers 20, 21, 22, 35A and 36A and sprockets 23. Accordingly, the rear and front frame members 12A and 12C are bent to allow the sprocket 14 to be offset. It is therefore seen from FIG. 6 that the reinforcement arm 32A is slanted to appropriately match the shape of the frame 12.

Although the track extension 30 is shown as being used with a track conversion unit 10, it is contemplated to provide such track extensions with other types of tracks (e.g., agricultural, army such as tanks, industrial, recreational vehicles amongst others). For instance, vehicles with permanent tracks may benefit from an increased footprint, whereby it is desired to provide extensions for all types of track systems. The track extension 30 has a frame that is adapted to be secured to an existing frame to provide the structural integrity required to support a track and to sustain the forces involved with the drive of a track on various terrains. The track extension 30 has idlers to support the track opposite the ground. The track extension 30 is adapted to support a trailing wheelset that will define the limits of the footprint, with the trailing wheelset being optionally part of the original track system to which the track extension 30 is added. Alternatively, the track extension 30 may have its own trailing wheelset. Finally, the tensioning mechanism (e.g., the one illustrated at 27 in FIGS. 1 to 8) provides adjustment in the tension of the track by the adjustment of the footprint of the track.

It is also pointed out that the track extension 30 may alternatively be used at a leading end of a track system, although the embodiments of the track extension illustrated in FIGS. 1 to 8 show the track extension at a trailing end of the track system.

The invention claimed is:

1. A track extension in combination with a track system, comprising:
  a track system having a track frame, wheels mounted to the frame and adapted to allow cyclic movement of a track about the frame, drive means in the frame adapted to transmit a drive of a vehicle to the track to drive the track in a cyclic movement, a base frame member of the track frame supporting some of the wheels, the base frame member being a bottommost portion of the track frame to define a first footprint of the track system;
  an extension frame releasably secured to an end of the track frame, the extension frame being immovably fixed to the track frame by having a tube mated to an end of a tube of the base frame member of the track frame;
  an idler wheelset mounted to an end of the extension frame and being positioned in extension alignment with the wheels of the base frame member; and
  a track mounted about the track frame and the extension frame such that a second footprint of the track is delimited at an end by the engagement of the track with the idler wheelset, the second footprint being larger than the first footprint.

2. The combination of claim 1, wherein the extension frame has a reinforcement arm immovably fixing the extension frame to the track frame, such that the extension frame is connected at two locations to the track frame.

3. The combination of claim 1, further comprising a tensioning mechanism between the idler wheelset and the extension frame, so as to adjust a position of the idler wheelset with respect to the track frame to tauten the track.

4. The combination of claim 1, further comprising idler wheels on opposed sides of the extension frame to support the track on the ground opposite the extension frame.

5. The combination of claim 1, wherein said end of the track frame and said end of the extension frame are similar, such that the idler wheelset is removed from the track frame to be used subsequently with the extension frame.

6. The combination of claim 5, further comprising a tensioning mechanism integral with the idler wheelset, so as to adjust a position of the idler wheelset with respect to the track frame to tauten the track.

7. The combination of claim 1, wherein the extension frame and the idler wheelset are positioned at a trailing end of the track system.

8. A track extension in combination with a track system, comprising:
   a track system having a track frame, wheels mounted to the frame and adapted to allow cyclic movement of a track about the frame, drive means in the frame adapted to transmit a drive of a vehicle to the track to drive the track in a cyclic movement, a base frame member of the track frame supporting some of the wheels, the base frame member being a bottommost portion of the track frame to define a first footprint of the track system;
   an extension frame releasably secured to an end of the track frame, the extension frame being immovably fixed to the track frame;
   an idler wheelset mounted to an end of the extension frame and being positioned in extension alignment with the wheels of the base frame member, the idler wheelset comprising idler wheels on opposed sides of the extension frame to support a track on the ground opposite the extension frame; and
   a track mounted about the track frame and the extension frame such that a second footprint of the track is delimited at an end by the engagement of the track with the idler wheelset, the second footprint being larger than the first footprint.

9. The combination of claim 8, wherein the extension frame has a reinforcement arm immovably fixing the extension frame to the track frame, such that the extension frame is connected at two locations to the track frame.

10. The combination of claim 8, further comprising a tensioning mechanism between the idler wheelset and the extension frame, so as to adjust a position of the idler wheelset with respect to the track frame to tauten the track.

11. The combination of claim 8, wherein said end of the track frame and said end of the extension frame are similar, such that the idler wheelset is removed from the track frame to be used subsequently with the extension frame.

12. The combination of claim 11, further comprising a tensioning mechanism integral with the idler wheelset, so as to adjust a position of the idler wheelset with respect to the track frame to tauten the track.

13. The combination of claim 8, wherein the extension frame and the idler wheelset are positioned at a trailing end of the track system.

14. A track extension in combination with a track system, comprising:
   a track system having a track frame, wheels mounted to the frame and adapted to allow cyclic movement of a track about the frame, drive means in the frame adapted to transmit a drive of a vehicle to the track to drive the track in a cyclic movement, a base frame member of the track frame supporting some of the wheels, the base frame member being a bottommost portion of the track frame to define a first footprint of the track system;
   an extension frame releasably secured to an end of the track frame, the extension frame being immovably fixed to the track frame;
   an idler wheelset mounted to an end of the extension frame and being positioned in extension alignment with the wheels of the base frame member, said end of the track frame and said end of the extension frame being similar, such that the idler wheelset is removed from the track frame to be used subsequently with the extension frame; and
   a track mounted about the track frame and the extension frame such that a second footprint of the track is delimited at an end by the engagement of the track with the idler wheelset, the second footprint being larger than the first footprint.

15. The combination of claim 14, further comprising a tensioning mechanism integral with the idler wheelset, so as to adjust a position of the idler wheelset with respect to the track frame to tauten the track.

16. The combination of claim 14, wherein the extension frame and the idler wheelset are positioned at a trailing end of the track system.

17. A track extension in combination with a track system, comprising:
   a track system having a track frame, wheels mounted to the frame and adapted to allow cyclic movement of a track about the frame, drive means in the frame adapted to transmit a drive of a vehicle to the track to drive the track in a cyclic movement, a base frame member of the track frame supporting some of the wheels, the base frame member being a bottommost portion of the track frame to define a first footprint of the track system;
   an extension frame releasably secured to an end of the track frame, the extension frame being immovably fixed to the track frame;
   an idler wheelset mounted to an end of the extension frame and being positioned in extension alignment with the wheels of the base frame member, the extension frame and the idler wheelset being positioned at a trailing end of the track system; and
   a track mounted about the track frame and the extension frame such that a second footprint of the track is delimited at an end by the engagement of the track with the idler wheelset, the second footprint being larger than the first footprint.

* * * * *